(12) United States Patent
Shoham et al.

(10) Patent No.: US 7,606,250 B2
(45) Date of Patent: Oct. 20, 2009

(54) ASSIGNING RESOURCES TO ITEMS SUCH AS PROCESSING CONTEXTS FOR PROCESSING PACKETS

(75) Inventors: Doron Shoham, Shoham (IL); Rami Zemach, Herzeliya (IL); Moshe Voloshin, Cupertino, CA (US); Alon Ratinsky, Hadera (IL); Sarig Livne, Tel Aviv (IL); John J. Williams, Jr., Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 613 days.

(21) Appl. No.: 11/099,094

(22) Filed: Apr. 5, 2005

(65) Prior Publication Data

US 2006/0221823 A1    Oct. 5, 2006

(51) Int. Cl.
*H04L 12/28* (2006.01)
*H04L 12/56* (2006.01)
*H04J 3/16* (2006.01)
*H04J 3/22* (2006.01)

(52) U.S. Cl. .................. 370/412; 370/351; 370/400; 370/468

(58) Field of Classification Search ............. 370/400, 370/411, 412, 430, 351, 468
See application file for complete search history.

(56) References Cited

U.S. PATENT DOCUMENTS

| | | | |
|---|---|---|---|
| 4,755,986 A | 7/1988 | Hirata | |
| 5,450,411 A | 9/1995 | Heil | |
| 5,896,501 A | 4/1999 | Ikeda et al. | |
| 5,949,780 A | 9/1999 | Gopinath | |
| 6,032,190 A | 2/2000 | Bremer et al. | |
| 6,128,666 A | 10/2000 | Muller et al. | |
| 6,563,790 B1 * | 5/2003 | Yu et al. | ............ 370/230 |

(Continued)

FOREIGN PATENT DOCUMENTS

EP     1085723 A2     5/2003

(Continued)

OTHER PUBLICATIONS

U.S. Appl. No. 10/669,624, filed Sep. 24, 2003, John Wakerly.

(Continued)

*Primary Examiner*—Ronald Abelson
(74) *Attorney, Agent, or Firm*—The Law Office of Kirk D. Williams

(57) ABSTRACT

Disclosed are, inter alia, methods, apparatus, data structures, computer-readable media, and mechanisms, for matching items with resources, such as, but not limited to packet processing contexts, output links, memory, storage, specialized hardware or software, compute cycles, or any other entity. One implementation includes means for maintaining distribution groups of items, means for maintaining differently aged resources queues, and means for matching resources identified as being at the head of the plurality of differently aged resources queues and as being primarily and secondarily associated with said distribution groups based on a set of predetermined criteria. For example, even though processing contexts can be shared among different distribution groups of packets, by giving preference to assigning recently used processing contexts for processing packets of a same distribution group, it is more likely that the processing instructions are already in the memory of this processing context, and therefore, processing will not be delayed until such instructions are retrieved into memory.

24 Claims, 9 Drawing Sheets

U.S. PATENT DOCUMENTS

| | | |
|---|---|---|
| 7,093,027 B1 | 8/2006 | Shabtay et al. |
| 2001/0049744 A1 | 12/2001 | Hussey et al. |
| 2004/0037322 A1 | 2/2004 | Sukonik et al. |
| 2004/0039787 A1* | 2/2004 | Zemach et al. ............... 709/212 |
| 2004/0039815 A1* | 2/2004 | Evans et al. .................. 709/225 |
| 2004/0117790 A1* | 6/2004 | Rhine .......................... 718/100 |
| 2005/0163143 A1* | 7/2005 | Kalantar et al. ............. 370/431 |

FOREIGN PATENT DOCUMENTS

| | | |
|---|---|---|
| WO | 02/09307 A1 | 1/2002 |
| WO | 02/39667 A2 | 5/2002 |

OTHER PUBLICATIONS

U.S. Appl. No. 10/227,114, filed Aug. 24, 2002, Zemach et al.
U.S. Appl. No. 10/227,119, filed Aug. 24, 2002, Sukonik et al.

* cited by examiner

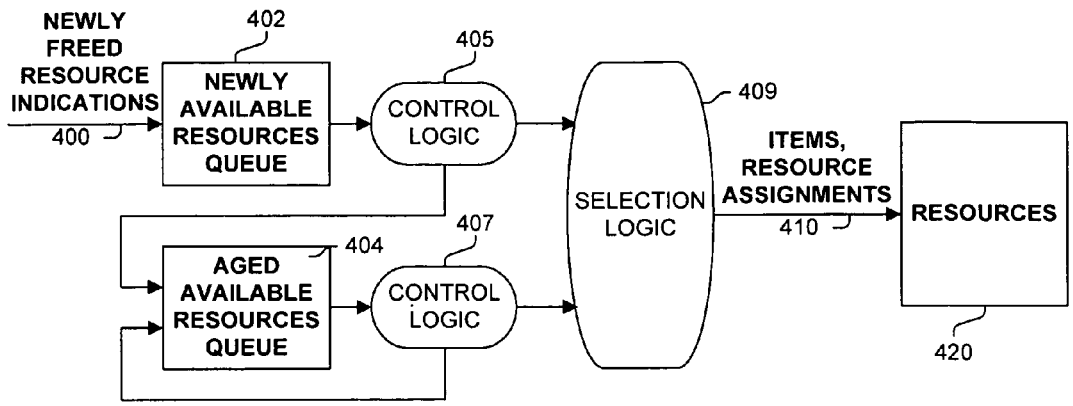

FIGURE 4

```
DATA
STRUCTURES
    500

RESOURCE[N] STRUCT {
  CONST SET OF PRIMARY DISTRIBUTION GROUPS;
  CONST SET OF SECONDARY DISTRIBUTION GROUPS;
  CONST SELECTION ORDER;
  SELECTION NEXT ITEM [K]  // ONE FOR EACH PRIORITY
  CONST REPEAT SELECTION NUMBER OF TIMES;
  SELECTION REPEAT DISTRIBUTION GROUP[L];
}

DISTRIBUTION GROUP[M] STRUCT {
  CONSTANT MINIMUM NUMBER OF RESOURCES;
  CONSTANT MAXIMUM NUMBER OF RESOURCES;
  ASSIGNED NUMBER OF RESOURCES;
  ASSIGNED PLUS QUEUED  NUMBER OF PRIMARY RESOURCES;
}
```

FIGURE 5

SELECTION CRITERIA 790 (IN DESCENDING PRIORITY ORDER)

0 – ASSIGNED NUMBER OF RESOURCES IS LESS THAN ITS MINIMUM NUMBER OF RESOURCES AND THE RESOURCE IS DESIGNATED TO IT AS PRIMARY

1 – ASSIGNED PLUS QUEUED NUMBER OF RESOURCES DESIGNATED TO THAT GROUP AS PRIMARY IS LESS THAN ITS MINIMUM NUMBER OF RESOURCES AND THE RESOURCE IS DESIGNATED TO IT AS SECONDARY

2 – ASSIGNED NUMBER OF RESOURCES IS LESS THAN ITS MAXIMUM NUMBER OF RESOURCES AND THE RESOURCE IS DESIGNATED TO IT AS PRIMARY

3 – ASSIGNED PLUS QUEUED NUMBER OF RESOURCES DESIGNATED TO THAT GROUP AS PRIMARY IS LESS THAN ITS MAXIMUM NUMBER OF RESOURCES AND THE RESOURCE IS DESIGNATED TO IT AS SECONDARY

FIGURE 7B

ASSIGNING RESOURCES TO ITEMS SUCH AS PROCESSING CONTEXTS FOR PROCESSING PACKETS

TECHNICAL FIELD

One embodiment of the invention relates to communications and computer systems, especially routers, packet switching systems, and other devices; and more particularly, one embodiment relates to assigning resources to items, such as, but not limited to packet processing contexts for use in processing packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards packets. For example, an enqueuing component of such a device receives streams of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are typically maintained in a separate memory. Once the entire packet is written into memory, the packet becomes eligible for processing, and an indicator (e.g., a packet handle) of the packet is typically placed in an appropriate destination queue for being serviced according to some scheduling methodology for packet processing. When this packet processing is complete, the packet is then gathered for sending (e.g., another processing function to build the processed packet to be forwarded based on the packet handle). The packet is then forwarded and the memory previously required for storing the sent packet becomes available for storing new information.

When there is a contention for resources, such as processing contexts, output links of a packet switching system or interface, memory, compute cycles or any other resource, it is important for resources to be allocated or scheduled according to some priority and/or fairness policy. Moreover, the amount of work required to schedule and to enqueue and dequeue a packet or other scheduled item is important, especially as the operating rate of systems increase. Many different mechanisms are available to share resources, and many of which are described hereinafter.

Ordinary time division multiplexing (TDM) is a method commonly used for sharing a common resource between several clients. All scheduled clients are served one at a time at predetermined times and for pre-allocated time periods, which is a very useful property for many applications. This method is often used for multiplexing multiple synchronous items over a higher speed communications link, such as that used for multiplexing multiple telephone calls over a single facility or interleaving packets. However, in a dynamic environment wherein items may not require the full amount of their allocated time slot such as when an item may only require none or only a portion of a particular allocated time slot, then bandwidth of the resource is typically wasted.

Ordinary round-robin (RR) is another method commonly used for sharing a common resource between several clients. All clients are served in a cyclic order. In each round every client will be served if it is eligible. When served, each client is permitted to send one packet. Servicing of queues is simple to implement and can be done in constant time, but, due to the varying size of packets, does not allocate bandwidth fairly. For example, certain higher priority or larger bandwidth ports or streams of packets may not get their desired amount of bandwidth, which may especially be the case when serving one large and numerous smaller traffic streams or when different priorities of traffic are scheduled.

In some scenarios, high priority (e.g., low latency), guaranteed bandwidth, best effort traffic (e.g., spare bandwidth) and other classifications of traffic compete for a common resource. Various known scheduling methods are designed to provide isolation, prioritization, and fair bandwidth allocation to traffic competing for a common resource. These are known as fair queuing methods. Some examples are Weighted Fair Queuing (WFQ), Self-Clocked Fair Queuing (SCFQ), and Deficit Round Robin/Surplus Round Robin (referred to as DRR).

WFQ and SCFQ depend upon arrival times as well as previous link utilization in order to calculate the next best packet to send. The accepted "ideal" behavior is bit-by-bit or weighted bit-by-bit round robin which assigns each bit of each packet in the system an ideal finish time according to the weighted fair sharing of the system. This is typically not practical in a packet-based system unless all packets are one bit. Generalizing the algorithm from bit-by-bit to packet-by-packet, each packet is assigned an ideal finish (departure) time and the packets are served in order of the earliest departure time. The inclusion of theoretical departure times in a scheduling method typically requires insertion into a sorted list which is known to be an $O(\log N)$ problem implemented in software, where N is typically the number of queues. In hardware, this problem may be reduced to an $O(1)$ operation with $O(\log N)$ resources.

DRR is a method used for sharing a common resource between several clients with different ratios between clients (i.e., some clients are allowed to consume more of the resources than others). The ratio between clients is typically defined by a parameter called a quantum. There are many variations and different implementations of DRR, including that described hereinafter.

DRR services queues using round-robin servicing with a quantum assigned to each queue. Unlike traditional round-robin, multiple packets up to the specified quantum can be sent resulting in each queue sending at least a quantum's worth of bytes. If the quantum for each queue is equal, then each queue will consume an equal amount of bandwidth.

This DRR approach works in rounds, where a round is one round-robin iteration over the queues that have items to be sent. Typically, when the queue is scheduled, it is allowed to transmit until its deficit becomes negative (or non-positive), and then the next queue is served. Packets coming in on different flows are stored in different queues. Each round, each queue is allocated a quantum worth of bytes, which are added to the deficit of each queue. Each queue is allowed to send out one or more packets in a DRR round, with the exact number of packets being sent in a round being dependent on its quantum and the size of the packets being sent. Typically, as long as the deficit is a positive (or non-negative) value (i.e., it is authorized to send a packet) in a DRR round for a queue and it has one or more packets to send, a packet is sent and its deficit is reduced based on the size of the sent packet. If there are no more packets in a queue after the queue has been serviced, one implementation sets the deficit corresponding to the queue to zero, while one implementation does this only if its deficit is negative. Otherwise, the remaining amount (i.e., the deficit minus the number of bytes sent) is maintained for the next DRR round.

DRR has a complexity of O(1)—that is the amount of work required is a constant and independent of the number of packets enqueued. In order to be work conserving, a packet should be sent every time a queue is scheduled no matter its size. Thus, the quantum used in DRR should be at least one maximum packet size (MTU) to guarantee that when the quantum is added to any deficit, the resulting value is at least zero. DRR provides fair bandwidth allocation and is easy to implement. It is work conserving and, because of its O(1) properties, it scales well with higher link speeds and larger number of queues. However, its scheduling behavior deviates quite a bit from the bit-by-bit round robin "ideal." In particular, latency for a system with N queues is Q*N where Q is the average quantum, which must be at least one maximum transmission unit (MTU).

However "fair" these scheduling techniques may be, they typically do not take into consideration certain optimizations that may allow an item to be processed more efficiently. Thus desired are new scheduling mechanisms.

SUMMARY

Disclosed are, inter alia, methods, apparatus, data structures, computer-readable media, and mechanisms, for matching items with resources, such as, but not limited to packet processing contexts, output links, memory, storage, specialized hardware or software, compute cycles, or any other entity. One embodiment includes means for maintaining distribution groups of items, means for maintaining differently aged resources queues, and means for matching resources identified as being at the head of the plurality of differently aged resources queues and as being primarily and secondarily associated with said distribution groups based on a set of predetermined criteria.

For example, one embodiment which allows processing contexts to be shared among different distribution groups of packets, gives preference to assigning recently used processing contexts for processing packets of a same distribution group. In doing so, it is more likely that the processing instructions are already in the memory of this recently used processing context, and therefore, processing can immediately commence without being delayed until such instructions are retrieved into memory.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 4 is a block diagram illustrating the matching of items and resources performed in one embodiment;

FIG. 5 is a block diagram illustrating data structures used in one embodiment;

FIG. 7B is a block diagram illustrating one set of predetermined criteria used in matching items and resources in one embodiment.

DETAILED DESCRIPTION

Figure 1:
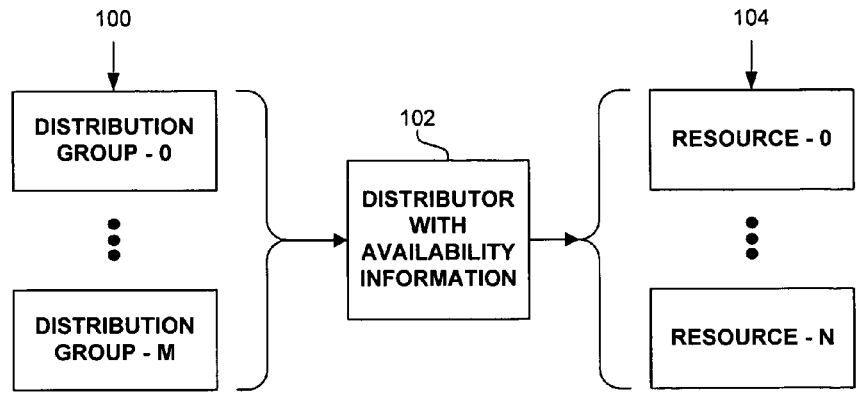
FIG. 1 is a block diagram of illustrating distribution groups and resources matched using one embodiment.

Disclosed are, inter alia, methods, apparatus, data structures, computer-readable media, and mechanisms, for matching items with resources, such as, but not limited to packet processing contexts, output links, memory, storage, specialized hardware or software, compute cycles, or any other entity.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular form of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, and mechanisms, for matching items with resources, such as, but not limited to packet processing contexts, output links, memory, storage, specialized hardware or software, compute cycles, or any other entity. Note, the term processing context is used herein to refer to a processing device or other mechanism, which typically includes functionality to enable processing (e.g., memory, registers, etc.). For example, in one embodiment, there are four processing contexts per processor.

One embodiment includes means for maintaining distribution groups of items, means for maintaining differently aged resources queues, and means for matching resources identified as being at the head of the differently aged resources queues and as being primarily and secondarily associated with said distribution groups based on a set of predetermined criteria.

In one embodiment, the predetermined criteria includes one or more relationships between the current assignment of resources to the distribution groups and provisioned minimum number of resources for the distribution groups. In one embodiment, the predetermined criteria includes one or more relationships between the current assignment of resources to the distribution groups and provisioned maximum number of resources for the distribution groups. In one embodiment, the items represent received information and the apparatus includes a mechanism for exerting backpressure for the distribution groups that have reached their said provisioned maximum numbers.

In one embodiment, the differently aged resources queues include a newly available resources queue, and the matching resources operation includes matching resources based on one or more relationships between the number of unassigned resources in the newly available resources queue primarily associated with the distribution groups. In one embodiment, the items represent packets and the resources represent processing contexts. In one embodiment, the items represent packets and the resources represent portions of memory (e.g., units of memory, blocks of memory, subsets of memory, ranges of addresses in memory, etc.). In one embodiment, the items represent received information, and the embodiment includes a mechanism for exerting backpressure for he distribution groups.

One embodiment maintains multiple differently aged resource groups including a newly available resource group, and maintains multiple different distribution groups for the items, with each of the different distribution groups related to multiple resources and such relationship including primarily associated, secondarily associated, and not associated. A particular resource of the newly available resource group is identified, and a particular distribution group is determined based on the relationships of the particular distribution group with the distribution groups and on the current assignment of distribution groups to the resources.

One embodiment maintains multiple differently aged resource groups including a newly available resource group, and multiple distribution groups for the items. A particular resource of the newly available resource group is preferentially associated with an item of one of the distribution groups over a resource in another of the differently aged resource groups. Each of the distribution groups are related to the resources, these relationships typically including being primarily associated, secondarily associated, and not associated. Typically, the preferentially associating includes determining a particular distribution group of the distribution groups based on the relationships of the particular distribution group with the distribution groups and on the current assignment of distribution groups to the resources.

In one embodiment for matching resources with items, each of the items associated are with a distribution group. Each of the resources currently not associated with one of the items is associated with one of multiple differently aged resource groups, which include a newly available resource group. A first resource is identified from the newly available resource group. A second resource is identified from a resource group of the differently aged resource groups. The pairings of items to these resources are determined, with the pairings including a first matching item for the first resource and a second matching item for the second resource. One of these pairing is then selected for associating based on predetermined criteria.

In one embodiment, a first distribution group of the distributing groups includes the first item; and wherein the predetermined criteria includes preferentially associating the first matching item with the first resource over the second matching item with the second resource if the first distribution group is currently not being serviced by a configured minimum number of resources of the resources. In one embodiment, a first distribution group of the distributing groups includes the first item and the first distribution group is secondarily associated with the first resource; and wherein the predetermined criteria includes preferentially deferring association of the first matching item with the first resource if another resource within the first distribution group as being one of its primary distribution groups is waiting to be associated with one of the items.

One embodiment for processing packets includes multiple processing contexts configured to process packets. Each of the processing contexts is associated with one or more distribution groups, and each of the packets is associated with at least one distribution group. A distribution mechanism is configured to distribute packets to the processing contexts based on their respective particular distribution group.

In one embodiment, the distributing of packets to the processing contexts includes preferentially matching a recently become available processing context with an underserved distribution group, wherein a distribution group is underserved if it is not being serviced by a configured minimum number of processing contexts. In one embodiment, each of the processing contexts is associated with one or more respective primary distribution groups and one or more respective secondary distribution groups; and the distributing of packets to the processing contexts includes preferentially deferring assignment of a context to a distribution group being secondarily associated if another context with the distribution group as being one of its primary distribution groups is waiting to be assigned a packet.

In one embodiment, each of the processing contexts is associated with one or more respective primary distribution groups and one or more respective secondary distribution groups; and wherein the distribution mechanism is configured to distribute a particular packet associated with a particular distribution group preferentially to a processing context whose primary distribution groups includes the particular distribution group else to a processing context whose secondary distribution groups includes the particular distribution group. In one embodiment, the distribution mechanism includes multiple queues for maintaining packets, with each of these queues being associated with a different one of the distribution groups.

In one embodiment, the distribution mechanism is configured to maintain at least two queues of available contexts, which include a newly available queue and an aged available queue; and wherein the distributing of the packets includes matching a packet associated with a particular one of the distribution groups with a context identified as being at the head of one of the queues which is also associated with the particular one of the distribution groups. In one embodiment, each particular context associated with the aged available queue was moved to the aged available queue from the newly available queue. In one embodiment, each particular context associated with the aged available queue was moved to the aged available queue from the newly available queue in response to the particular context being identified as currently invalid for assigning a packet to it (i.e., there are no available packets in the distributions groups that the particular context is allowed to process).

Turning to FIG. 1, illustrated is a block diagram of distribution groups and resources matched using one embodiment. As shown, there are M distribution groups 100 and N resources 104. Distributor, based on availability information and typically predetermined criteria, match (e.g., pair, allocate, assign, etc.) items from distribution groups 100 with resources 104.

Figure 2A:
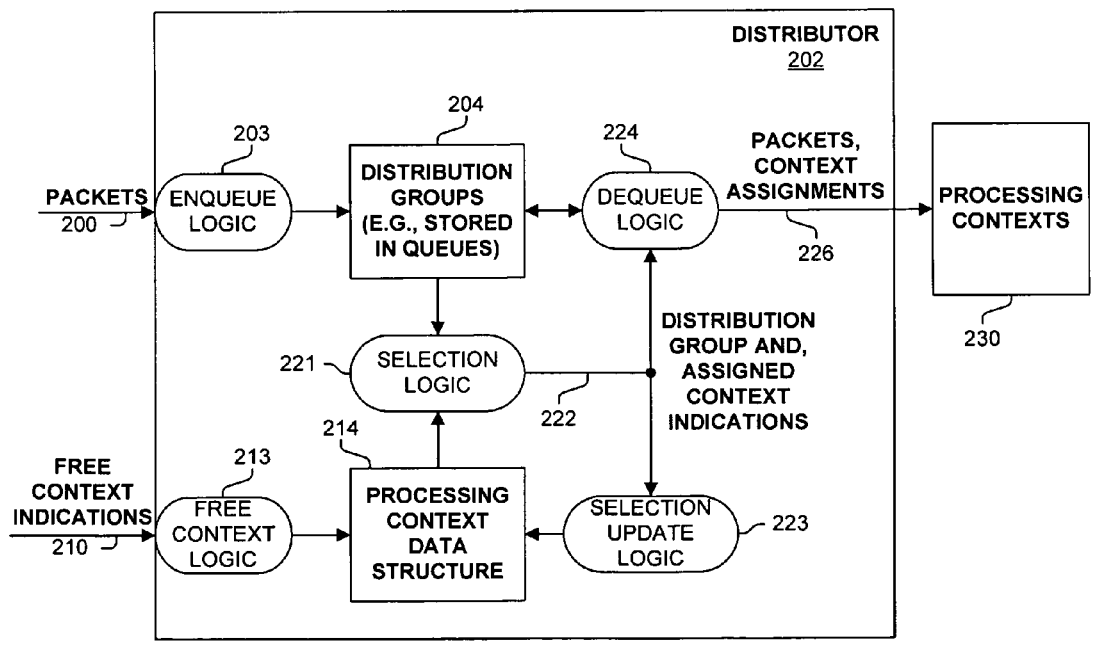
FIG. 2A is a block diagram illustrating a distributor used in one embodiment to match packets with processing contexts.

FIG. 2A illustrates a more concrete example of one embodiment wherein items correspond to packets, and resources correspond to processing contexts for processing the packets. As shown and in one embodiment, distributor 202 includes multiple distribution groups 204, which in this illustration are implemented as queues to maintain ordering for processing the packets. Packets 200 are received by distributor 202, which uses enqueue logic 203 to place them in their appropriate distribution groups 204. Distributor 202 also includes a processing context data structure 214 to identify the available contexts, and typically their preferred assignments information (e.g., priority information for assigning to which distribution group or groups, etc.). Received free context indications 210 are used by free context logic 213 to update processing context data structure 214.

Typically, when one or more processing contexts 230 are free, selection logic 221, based on processing context data structure 214 and/or which distribution groups 204 are non-empty, matches a free processing context of processing contexts 230 with one of the distribution groups 204, which causes dequeue logic 224 to forward a packet from a corresponding distribution group 204 as well as the assigned processing context information 226 to the processing context 230 for processing the packet. Additionally, selection update logic 223 updates processing data structure 214 based on this pairing. Note, the selection processes available to used in one embodiment is extensible, and described herein are several of an unlimited number of possibilities. The exact selection process or processes employed by an embodiment is typically selected to match the needs of the application being addressed by the embodiment.

Figure 2B:
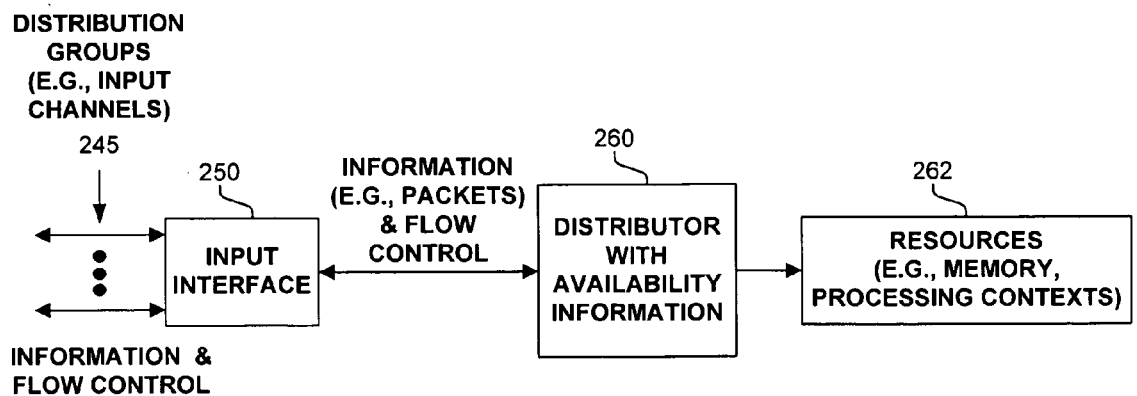
FIG. 2B is a block diagram illustrating a distributor used in one embodiment to allocate resources for received information.

FIG. 2B illustrates another example of one embodiment using a distributor to allocate resources for received information. As shown, information is received by input interface 250 over one or more channels/distribution groups 245. One embodiment also provides a mechanism for exerting flow control over channels 245, such as in response to distributor 260 identifying the flow control state based on the amount of resources 262 being consumed by a distribution group in relation to some criteria (e.g., comparing the current usage of a distribution group to its provisioned minimum and/or maximum number of resources, etc.). Distributor 260 matches available resources 262 (e.g., available portions of memory, processing contexts, etc.) and distributes the information (e.g., packets) to resources 262 in a manner described herein.

Figure 3:
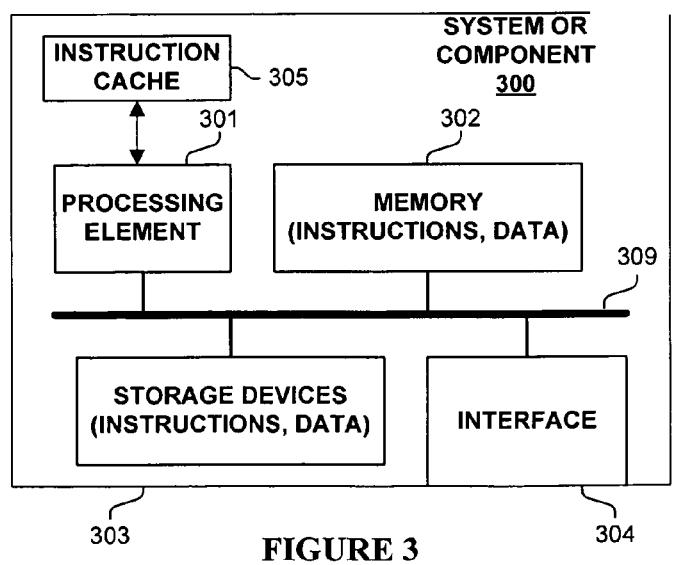
FIG. 3 is a block diagram illustrating a component or system used in one embodiment.

FIG. 3 is a block diagram of an exemplary system or component 300 used in one embodiment for matching items with resources. In one embodiment, system or component 300 performs one or more processes corresponding to one of the flow diagrams illustrated or otherwise described herein.

In one embodiment, system or component 300 includes a processing element 301 (e.g., a processor, customized logic, etc.), memory 302, storage devices 303, and an interface 304 for receiving and sending packets, items, and/or other information, which are typically coupled via one or more communications mechanisms 309 (shown as a bus for illustrative purposes.) Various embodiments of component 300 may include more or less elements. For example, explicitly shown is instruction cache 305 attached to processing element 305 to help illustrate that one embodiment (of an unlimited number of embodiments) attempts to minimize instruction cache misses by re-assigning newly freed processing contexts to a distribution group that use the same instruction set.

The operation of component 300 is typically controlled by processing element 301 using memory 302 and storage devices 303 to perform one or more scheduling tasks or processes. Memory 302 is one type of computer-readable medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with the invention. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with the invention.

FIG. 4 is a block diagram illustrating one mechanism used in one embodiment for matching of items and resources, and which takes into account the relative age of the freed resource. As shown, newly freed resource indications 400 are received into newly available resources queue 402. This mechanism also employs as second resource queue 404 for maintaining aged available resources. Control logic 405 and 407 typically identify in parallel and/or simultaneously a matching resource and distribution group and from which selection logic 409 selects between, typically based on some predetermined criteria to identify the distribution queue—resource assignment to be used. An indication 410 of this selected pairing along with a corresponding item from the selected distribution queue are forwarded to the resource within resources 420. In one embodiment, if a resource at the front of an available resource queues 405 and 407 does not produce a valid match for a distribution group, then that resource(s) is/are placed at the end of the aged available resources queue 404. Note, illustrated are two resource queues 405 and 407 which are used in one embodiment; however, one embodiment uses more than two resource queues, typically for easily identifying different periods of aging of a freed resource.

FIG. 5 is a block diagram illustrating data structures 500 used in one embodiment. As illustrated, a resource structure for each of the N resources is used, and includes indications of a distribution groups which are primary (e.g., preferentially assigned to it) and secondarily (e.g., available for assigning to it). In one embodiment, these sets are implemented as bitmaps. One embodiment, by preferentially pairing resources with its primary distribution groups as well as using a mechanism to re-assign newly freed resources, such as, but not limited to the mechanism illustrated in FIG. 4, is able to provide some scheduling optimizations, such as possibly decreasing the number of instruction cache misses in the application of assigning packets from distribution groups to packet processors. In one embodiment, a resource structure also includes some information for selecting among multiple matching distribution groups, such as identifying a selection order to use (e.g., contexts can use a different round robin increment or hashing value to avoid all contexts syncing to the same distribution group), and the ability to define a maximum or preferred number of times to use the same distribution group before moving to a next distribution group.

In one embodiment, a distribution group structure for each of the M distribution groups is used, and includes a predetermined minimum number and maximum number of contexts to be assigned to process items from the corresponding distribution group, as well as current assignment information, such as, but not limited to the number of resources currently assigned to the distribution group, and the number of resources either currently assigned to the distribution group or waiting to be assigned to a distribution group with this distribution group designated as one of its primary distribution group(s). This information can then be used in helping identify which distribution group to match to a particular resource, such as, but not limited to, that described in relation to FIGS. 7A-B.

Figure 6A:
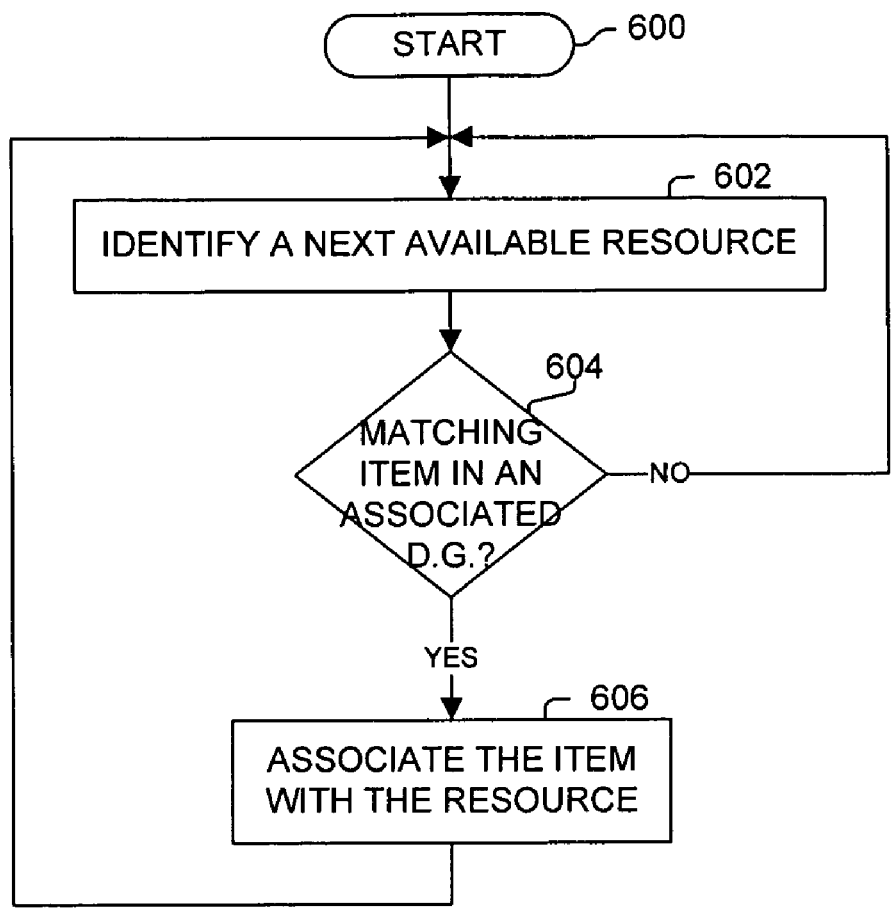
FIG. 6A is a flow diagram illustrating a process for matching items and resources performed in one embodiment.

FIG. 6A is a flow diagram illustrating a process for matching items and resources performed in one embodiment. This is an example of a simple mechanism employed in one embodiment. Processing begins with process block 600, and proceeds to process block 602, wherein a next available resource is identified. As determined in process block 604, if an item is available in a matching distribution group, then in process block 606, the item from the distribution group is associated with the resource. Processing returns to process block 602.

Figure 6B:
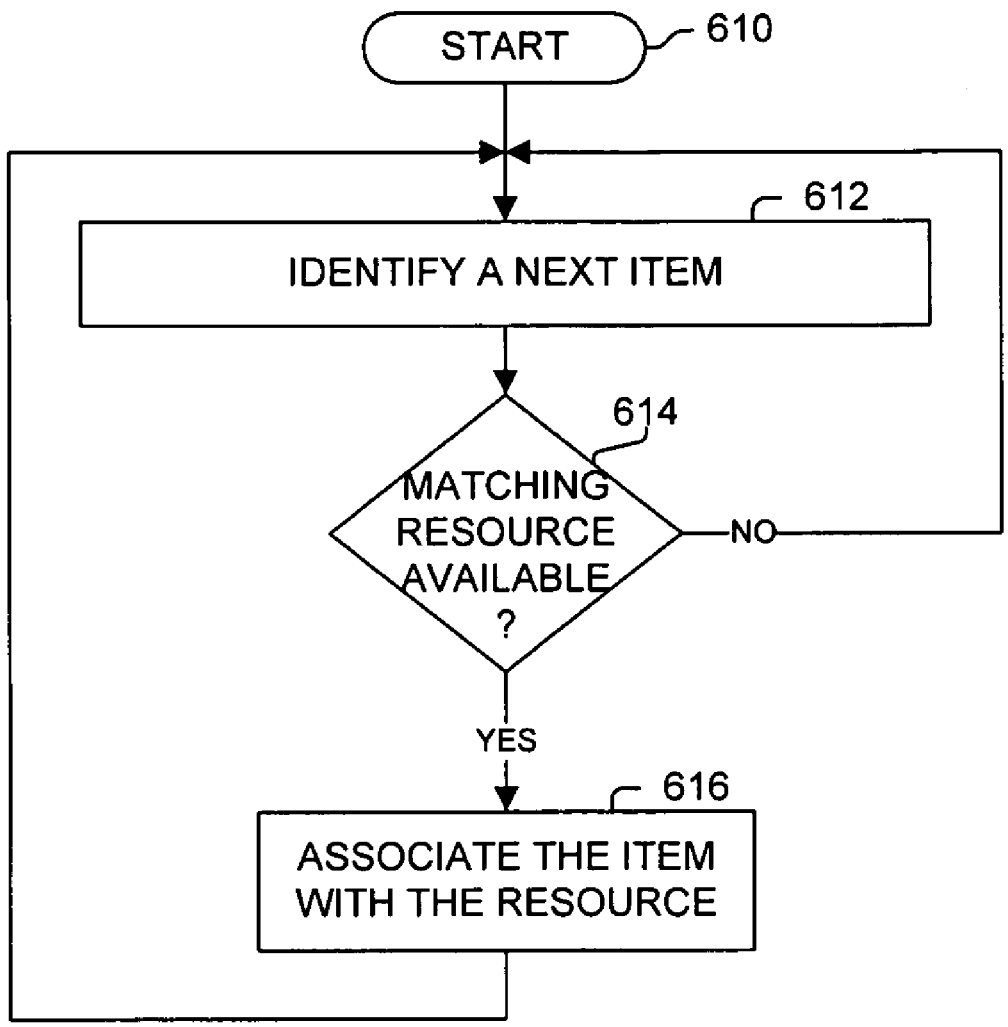
FIG. 6B is a flow diagram illustrating a process for matching items and resources performed in one embodiment.

FIG. 6B is a flow diagram illustrating a process for matching items and resources performed in one embodiment. This is an example of a simple mechanism employed in one embodiment. Processing begins with process block 610, and proceeds to process block 612, wherein a next available item of a distribution group is identified. As determined in process block 614, if a matching resource is available, then in process block 616, the item from the distribution group is associated with the resource. Processing returns to process block 612.

Figure 6C:
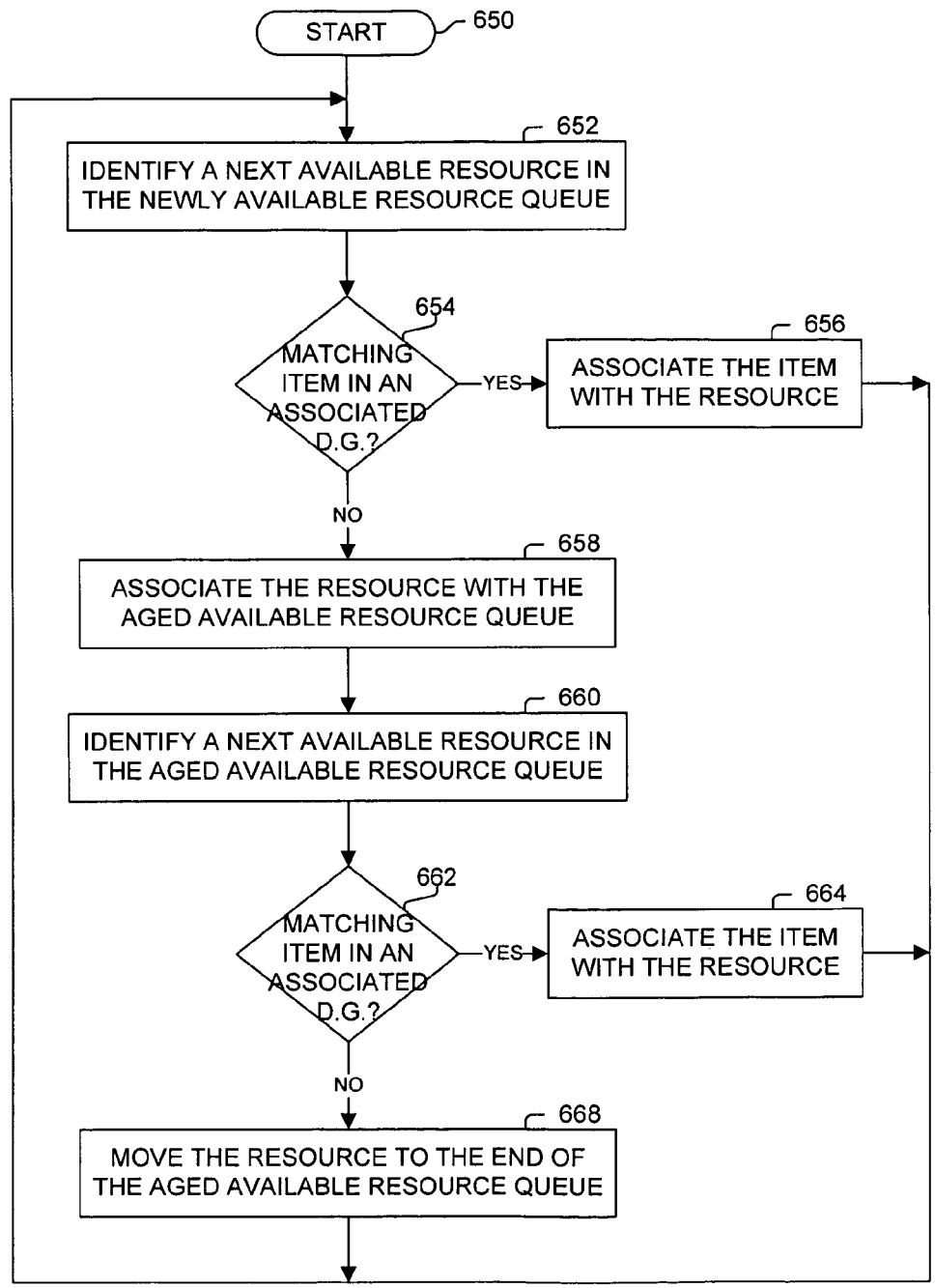
FIG. 6C is a flow diagram illustrating a process for matching items and resources performed in one embodiment.

FIG. 6C is a flow diagram illustrating a process for matching items and resources performed in one embodiment. This is a more complex mechanism which takes into account the relative age of the available resources, and preferentially assigns a resource from a newly available resource queue over resources in an aged available resource queue. Note, as described herein, such as, but not limited to, in relation to FIGS. 4, 7A and 7B, one embodiment provisionally matches resources from each of the available resource queues (or groups, sets, etc.), and then assigns them all or selects among them to identify which assignment will be used.

Processing of FIG. 6C begins with process block 650, and proceeds to process block 652, wherein a next available resource in the newly available resource queue is identified. As determined in process block 654, if there is an item in an associated distribution group (e.g., it is a valid match), then in process block 656, the item for the distribution group is associated with the resource. Processing returns to process block 652.

Otherwise, in process block 658, this resource is associated (e.g., enqueued) with the aged available resource queue. In process block 660, a next available resource in the aged available resource queue is identified. As determined in process block 662, if there is an item in an associated distribution group (e.g., it is a valid match), then in process block 664, the item for the distribution group is associated with the resource, and processing returns to process block 652. Otherwise, the resource is moved to the end of the aged available resource queue in process block 668, and processing returns to process block 652.

Figure 7A:
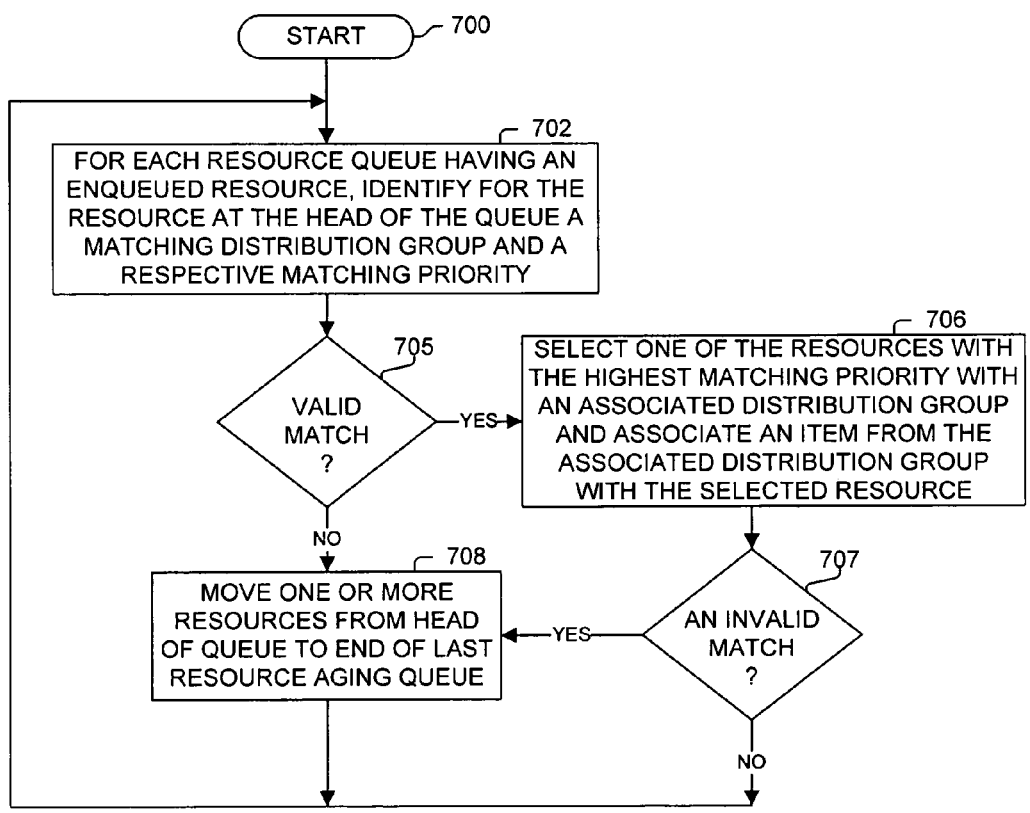
FIG. 7A is a flow diagram illustrating a process for matching items and resources performed in one embodiment.

FIG. 7A is a flow diagram illustrating a process for matching items and resources performed in one embodiment. Processing begins with process block 700, and proceeds to process block 702, wherein for each resource queue having an enqueued resource, a matching distribution queue is identified (if one exists) for the resource at the head of the respective resource queue. As determined in process block 705, if there is at least one valid selection, then a resource will be assigned an item from a distribution group and processing proceeds to process block 706; otherwise processing proceeds directly to process block 708. In process block 706, one of the matches with the highest matching priority is selected and used. As determined in process block 707, if there is at least one invalid selection (i.e., there are no available items in the distributions groups that the corresponding context is allowed to process), processing proceeds to process block 708; otherwise processing returns to process block 702. In process block 708, the resource(s) corresponding to the invalid match is/are moved to the end of the aged available resource queue; and processing returns to process block 702.

FIG. 7B is a block diagram illustrating one set of predetermined criteria 790 used in matching items and resources in one embodiment, such as, but not limited to, for selecting among multiple possible matches as determined in process block 706 of FIG. 7A, or by selection logic 221 (FIG. 2), or by selection logic 409 (FIG. 4).

In one embodiment, four different matching priorities of predetermined criteria 790 are used for identifying which distribution group having an eligible item currently matches a resource. The highest priority is priority zero, which corresponds to the assigned number of resources to the distribution group being less than its minimum number and the resource is designated primary for the distribution group. Next, priority one corresponds to the assigned number of resources to the distribution group plus the queued available number of resources designating the distribution group as primary is less than its maximum number and the resource is designated secondary for the distribution group. Next, priority two corresponds to the assigned number of resources to the distribution group being less than its minimum number and the resource is designated primary for the distribution group. Finally, priority three corresponds to the assigned number of resources to the distribution group plus the queued available number of resources designating the distribution group as primary is less than its maximum number and the resource is designated secondary for the distribution group.

Figure 8:
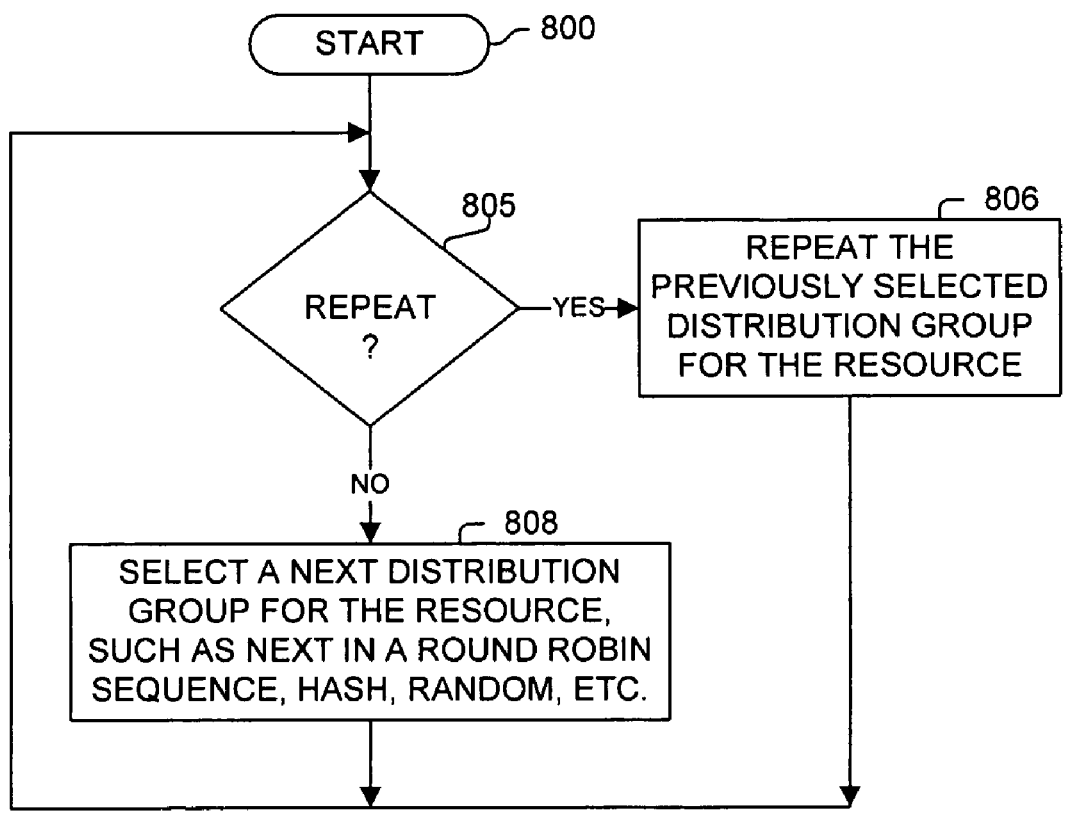
FIG. 8 is a flow diagram illustrating a process for selecting among multiple possible matching distribution groups performed in one embodiment.

FIG. 8 is a flow diagram illustrating a process for selecting among multiple possible matching distribution groups performed in one embodiment. It is possible that there will be multiple matching and eligible distribution groups for a resource, and thus some tie-breaking mechanism is typically employed by one embodiment. Processing begins with process block 800. As determined in process block 805, if a last used distribution group is to be repeated (such as based on a predetermined repeat number of times configuration parameter for the distribution group), then in process block 806, the same distribution group is used (and typically some data structure or other mechanism is updated to reflect such). Otherwise, in process block 808, a next distribution group is identified, such as, but not limited to using a round robin (possibly with different resources using different round robin sequences), a hash function, a random function, or any other technique. Processing returns to process block 805.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for matching resources with items and for processing said items, the apparatus comprising:
    means for maintaining a plurality of distribution groups of said items;
    means for maintaining a plurality of differently aged resources queues;
    means for matching resources identified as being at the head of the plurality of differently aged resources queues and as being primarily and secondarily associated with said distribution groups based on a set of predetermined criteria; and
    means for processing said items using said resources identified by said means for matching resources for said distribution groups said associated with said items.

2. The apparatus of claim 1, wherein said predetermined criteria includes one or more relationships between the current assignment of resources to the plurality of distribution groups and provisioned minimum number of resources for said distribution groups.

3. The apparatus of claim 2, wherein said predetermined criteria includes one or more relationships between the current assignment of resources to the plurality of distribution groups and provisioned maximum number of resources for said distribution groups.

4. The apparatus of claim 3, wherein said items represent received information and the apparatus includes means for exerting backpressure for said distribution groups that have reached their said provisioned maximum numbers.

5. The apparatus of claim 2, wherein the plurality of differently aged resources queues includes a newly available resources queue; and wherein said matching resources includes matching resources based on one or more relationships between the number of unassigned resources in the newly available resources queue primarily associated with said distribution groups.

6. The apparatus of claim 1, wherein said items represent received information, and the apparatus includes means for exerting backpressure for said distribution groups.

7. The apparatus of claim 1, wherein said items represent packets and said resources represent processing contexts.

8. The apparatus of claim 1, wherein said items represent packets and said resources represent portions of memory.

9. A method for matching resources with items and for processing said items, the method comprising:
    maintaining a plurality of differently aged resource groups including a newly available resource group;
    maintaining a plurality of distribution groups for said items;
    preferentially associating a particular resource of the newly available resource group with a particular item of one of said distribution groups over a resource in another of said differently aged resource groups; and
    processing the particular item using the particular resource;
    wherein each of said distribution groups are related to said resources, a plurality of said resources being currently associated with said differently aged resource groups, said relationship including primarily associated, and secondarily associated; and wherein said preferentially associating includes determining a particular distribution group of said distribution groups based on said relationships of the particular distribution group with said distribution groups and on the current assignment of distribution groups to said resources.

10. A method for matching resources with items and for processing said items, each of said items associated with a distribution group of a plurality of distribution groups, each of said resources currently not associated with one of said items is associated with one of a plurality of differently aged resource groups, said differently aged resource groups including a newly available resource group, the method comprising
    identifying a first resource from the newly available resource group and a second resource from a resource group of said differently aged resource groups;
    determining pairings based on primary and secondary associations defined for said distribution groups, said pairings including a first matching item for the first resource and a second matching item for the second resource;
    selecting which of said pairings to associate based on predetermined criteria;
    processing the first matching item using the first resource; and
    processing the second matching item using the second resource.

11. The method of claim 10, wherein a first distribution group of said distributing groups includes the first item; and wherein said predetermined criteria includes preferentially associating the first matching item with the first resource over the second matching item with the second resource if the first distribution group is currently not being serviced by a configured minimum number of resources of said resources.

12. The method of claim 11, wherein a first distribution group of said distributing groups includes the first item and the first distribution group is secondarily associated with the first resource; and wherein said predetermined criteria includes preferentially deferring association of the first matching item with the first resource if another resource within the first distribution group as being one of its primary distribution groups is waiting to be associated with one of said items.

13. The method of claim 10, wherein a first distribution group of said distributing groups includes the first item and the first distribution group is secondarily associated with the first resource; and wherein said predetermined criteria includes preferentially deferring association of the first matching item with the first resource if another resource within the first distribution group as being one of its primary distribution groups is waiting to be associated with one of said items.

14. An apparatus for matching resources with items and for processing said items, each of said items associated with a distribution group of a plurality of distribution groups, each of said resources currently not associated with one of said items is associated with one of a plurality of differently aged resource groups, said differently aged resource groups including a newly available resource group, the apparatus comprising:

means for identifying a first resource from the newly available resource group and a second resource from a resource group of said differently aged resource groups;

means for determining pairings, said pairings including a first matching item for the first resource and a second matching item for the second resource;

means for selecting which pairing to associate based on predetermined criteria; and means for processing the first matching item using the first resource and for processing the second matching item using the second resource.

15. The apparatus of claim 14, wherein a first distribution group of said distributing groups includes the first item; and wherein said predetermined criteria includes preferentially associating the first matching item with the first resource over the second matching item with the second resource if the first distribution group is currently not being serviced by a configured minimum number of resources of said resources.

16. The apparatus of claim 15, wherein a first distribution group of said distributing groups includes the first item and the first distribution group is secondarily associated with the first resource; and wherein said predetermined criteria includes preferentially deferring association of the first matching item with the first resource if another resource within the first distribution group as being one of its primary distribution groups is waiting to be associated with one of said items.

17. The apparatus of claim 14, wherein a first distribution group of said distributing groups includes the first item and the first distribution group is secondarily associated with the first resource; and wherein said predetermined criteria includes preferentially deferring association of the first matching item with the first resource if another resource within the first distribution group as being one of its primary distribution groups is waiting to be associated with one of said items.

18. An apparatus for processing packets, the apparatus comprising:
a plurality of processing contexts configured to process packets, each of the plurality of processing contexts being associated with one or more distribution groups of a plurality of distribution groups, each of said packets associated with at least one distribution group of the plurality of distribution groups; and
a distribution mechanism configured to distribute packets to the plurality of processing contexts based on said respective particular distribution group;
wherein each of the plurality of processing contexts is associated with one or more respective primary distribution groups and one or more respective secondary distribution groups of said one or more distribution groups; and
wherein said distributing packets to the plurality of processing contexts based on said respective particular distribution group includes preferentially deferring assignment of a context to a distribution group that is secondarily associated to the distribution group in response to another context with the distribution group being one of its primary distribution groups waiting to be assigned a packet.

19. The apparatus of claim 18, wherein said distributing packets to the plurality of processing contexts based on said respective particular distribution group includes preferentially matching a recently become available processing context with an underserved distribution group, wherein a distribution group is underserved if it is not being serviced by a configured minimum number of processing contexts of said plurality of processing contexts.

20. An apparatus for processing packets, the apparatus comprising:
a plurality of processing contexts configured to process packets, each of the plurality of processing contexts being associated with one or more distribution groups of a plurality of distribution groups, each of said packets associated with at least one distribution group of the plurality of distribution groups; and
a distribution mechanism configured to distribute packets to the plurality of processing contexts based on said respective particular distribution group;
wherein each of the plurality of processing contexts is associated with one or more respective primary distribution groups and one or more respective secondary distribution groups of said one or more distribution groups; and
wherein the distribution mechanism is configured to distribute a particular packet associated with a particular distribution group of said distribution groups preferentially to a processing context of said processing contexts whose said one or more primary distribution groups includes the particular distribution group else to a processing context of said processing contexts whose said one or more secondary distribution groups includes the particular distribution group.

21. The apparatus of claim 20, wherein the distribution mechanism includes a plurality of queues, each of the plurality of queues associated with a different one of the plurality of distribution groups.

22. An apparatus for processing packets, the apparatus comprising:
a plurality of processing contexts configured to process packets, each of the plurality of processing contexts being associated with one or more distribution groups of a plurality of distribution groups, each of said packets associated with at least one distribution group of the plurality of distribution groups; and
a distribution mechanism configured to distribute packets to the plurality of processing contexts based on said respective particular distribution group;
wherein the distribution mechanism is configured to maintain at least two queues of available contexts of said plurality of contexts, said at least two queues including a newly available queue and an aged available queue; and
wherein said distributing packets to the plurality of processing contexts based on said respective particular distribution group includes matching a packet associated with a particular one of said distribution groups with a context identified as being at the head of one of said queues also associated with the particular one of the plurality of distribution groups.

23. The apparatus of claim 22, wherein each particular context associated with the aged available queue was moved to the aged available queue from the newly available queue.

24. The apparatus of claim 22, wherein each particular context associated with the aged available queue was moved to the aged available queue from the newly available queue in response to said particular context being identified as currently invalid for assigning a packet to it.

* * * * *

UNITED STATES PATENT AND TRADEMARK OFFICE
CERTIFICATE OF CORRECTION

| | |
|---|---|
| PATENT NO. | : 7,606,250 B2 |
| APPLICATION NO. | : 11/099094 |
| DATED | : October 20, 2009 |
| INVENTOR(S) | : Shoham et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1171 days.

Signed and Sealed this

Fifth Day of October, 2010

David J. Kappos
*Director of the United States Patent and Trademark Office*